(12) United States Patent
Zong et al.

(10) Patent No.: US 10,782,246 B2
(45) Date of Patent: Sep. 22, 2020

(54) MOVABLE RAY INSPECTION SYSTEM AND RAY INSPECTION METHOD FOR A CONTAINER

(71) Applicants: Nuctech Company Limited, Beijing (CN); Tsinghua University, Beijing (CN)

(72) Inventors: Chunguang Zong, Beijing (CN); Ying Li, Beijing (CN); Hejun Zhou, Beijing (CN); Quanwei Song, Beijing (CN); Jianmin Li, Beijing (CN); Yulan Li, Beijing (CN); Yuanjing Li, Beijing (CN); Li Zhang, Beijing (CN); Zhiqiang Chen, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 275 days.

(21) Appl. No.: 15/827,739

(22) Filed: Nov. 30, 2017

(65) Prior Publication Data
US 2018/0172604 A1 Jun. 21, 2018

(30) Foreign Application Priority Data
Dec. 15, 2016 (CN) .......................... 2016 1 1164289

(51) Int. Cl.
*G01N 23/04* (2018.01)
*G01N 21/90* (2006.01)
(Continued)

(52) U.S. Cl.
CPC ......... *G01N 21/9081* (2013.01); *G01N 21/01* (2013.01); *G01N 23/04* (2013.01); *G01V 5/0016* (2013.01); *G01V 5/0025* (2013.01)

(58) Field of Classification Search
CPC .... G01V 5/0016; G01V 5/0008; G01V 5/008; G01V 5/0041; G01N 23/04; G01N 23/2223; G01N 23/10
See application file for complete search history.

(56) References Cited

U.S. PATENT DOCUMENTS 5,754,617 A 5/1998 Itoh
RE39,396 E * 11/2006 Swift et al. ............ G01N 23/20
378/57
(Continued)

FOREIGN PATENT DOCUMENTS

GB 2551720 A 1/2018
WO WO-2018054205 A1 3/2018

OTHER PUBLICATIONS

"United Kingdom Application Serial No. GB1719990.2, Search and Examination Report dated May 16, 2018", (dated May 16, 2018), 7 pgs.

*Primary Examiner* — Don K Wong
(74) *Attorney, Agent, or Firm* — Schwegman Lundberg & Woessner, P.A.

(57) ABSTRACT

A movable ray inspection system used to be mounted in a container yard to inspect an object within a container is provided. The movable ray inspection system includes: a ray generator device configured to emit a ray, a ray receiving device configured to receive the ray, and at least one chamber for receiving the ray generator device and the ray receiving device therein. Each of the at least one chamber is configured to be a standard container or a chamber which has a same shape, a same size and a same structure as a standard container such that the movable ray inspection system is adapted to be stacked in the container yard.

19 Claims, 8 Drawing Sheets

(51) Int. Cl.
*G01V 5/00* (2006.01)
*G01N 21/01* (2006.01)

(56) References Cited

U.S. PATENT DOCUMENTS

| | | | |
|---|---|---|---|
| 2006/0056584 A1* | 3/2006 | Allman | G01V 5/0008 378/57 |
| 2009/0257555 A1* | 10/2009 | Chalmers | G01N 23/20 378/57 |

* cited by examiner

MOVABLE RAY INSPECTION SYSTEM AND RAY INSPECTION METHOD FOR A CONTAINER

CROSS-REFERENCE TO RELATED APPLICATION

The present application claims priority to Chinese Patent Application No. 201611164289.6, filed on Dec. 15, 2016, entitled "MOVABLE RAY INSPECTION SYSTEM AND RAY INSPECTION METHOD FOR A CONTAINER", which is incorporated herein by reference in its entirety.

BACKGROUND

Technical Field

The present disclosure relates to technical field of container inspection, and particularly to a movable ray inspection system and a ray inspection method for a container mounted in a container yard.

Description of the Related Art

Currently, many places where containers are stacked, such as a cargo terminal, a wharf, or a port, encounter land shortage. Meanwhile, a conventional container inspection system is relatively large and commonly needs a separated field or place for mounting. However, such a container inspection system not only occupies much valuable space of a port but also causes problems such as long construction period, high cost.

Further, a conventional container inspection system commonly operates as following: containers are unloaded to a port and transported to a container yard, then, a container to be inspected is transported from the container yard by a vehicle to a field where the inspection system is located and then the container is scanned and inspected; after inspection, the container is transported back to the container yard by the vehicle. Such an inspection process spends time and needs great effort, which reduces efficiency of operation in the container yard. In addition, the conventional container inspection system further needs construction and is hard to assemble and disassemble, and even is non-transferred.

SUMMARY

The present disclosure provides a movable ray inspection system, which can be mounted in a container yard to inspect an object in a container, and a ray inspection method.

According to an aspect of the present disclosure, there is provided a movable ray inspection system used to be mounted in a container yard to inspect an object within a container, the movable ray inspection system comprising: a ray generator device configured to emit a ray, a ray receiving device configured to receive the ray, at least one chamber for receiving the ray generator device and the ray receiving device therein, and a moving device for the movable ray inspection system, the movable ray inspection system being configured to define a scanning passage, wherein:

each of the at least one chamber is configured to be a standard container or a chamber which has a same shape, a same size and a same structure as a standard container, such that the movable ray inspection system is adapted to be stacked in the container yard, and the moving device is configured to allow the movable ray inspection system to move in a preset direction so as to inspect the object within the container.

In an embodiment, each of the at least one chamber is provided with a hoisting coupling that is the same as that of the standard container so as to be hoisted by a container transfer apparatus.

In an embodiment, the moving device comprises a guide wheel arranged on a bottom surface of the chamber and a guide rail arranged on ground, and the guide wheel is movably fitted on the guide rail; or, the moving device comprises a moving wheel mounted on the bottom surface of the chamber.

In an embodiment, a height of the moving device is equal to a difference between a height of a high container and a height of a standard container.

In an embodiment, the movable ray inspection system further comprises a driving device configured for driving the movable ray inspection system to move.

In an embodiment, the movable ray inspection system includes a first chamber, a second chamber and a third chamber, the first chamber is arranged at a side of the scanning passage in the container yard, and the second chamber and the third chamber, stacked up-down with each other, are arranged at the other side of the scanning passage, and the first chamber is provided with the ray generator device therein, and each of the second chamber and the third chamber is provided with the ray receiving device therein, and the ray generator device and the ray receiving devices are substantially aligned with one another in a second direction perpendicular to a first direction along which the scanning passage extends.

In an embodiment, the movable ray inspection system comprises a first chamber, a second chamber, a third chamber and a fourth chamber, the second chamber and the first chamber, stacked up-down with each other, are arranged at a side of the scanning passage in the container yard, and the third chamber and the fourth chamber, stacked up-down with each other, are arranged at the other side of the scanning passage, and wherein, each of the first chamber located downside and the fourth chamber located downside is provided with the ray generator device and the ray receiving device therein, and each of the second chamber located upside and the third chamber located upside is provided with the ray receiving device, wherein the ray generator device and the ray receiving device provided in each of the first chamber and the fourth chamber are arranged to space away from each other in the first direction along which the scanning passage extends, and the ray generator device in the first chamber is substantially aligned with the ray receiving devices in the third chamber and the fourth chamber in the second direction perpendicular to the first direction, and the ray receiving devices in the first chamber and the second chambers are substantially aligned with the ray generator device in the fourth chamber in the second direction perpendicular to the first direction.

In an embodiment, the first chamber and the third chamber located downside are both provided with the moving devices on their bottom surfaces respectively.

In an embodiment, the first chamber located downside and the fourth chamber located downside are both provided with the moving devices on their bottom surfaces respectively.

In an embodiment, the movable ray inspection system further includes a rigid connection device configured to connect the chambers at either side of the scanning passage.

In an embodiment, the movable ray inspection system comprises a chamber arranged at a side of the scanning passage in the container yard and provided with the ray generator device and the ray receiving device.

In an embodiment, the movable ray inspection system comprises a chamber arranged at a side of the scanning passage in the container yard and, the ray generator device is disposed within the chamber and comprises a plurality of detectors arranged in a shape of "L", wherein a part of the plurality of detectors are arranged on an inner wall of the chamber and the other part of the plurality of detectors are arranged on a cross bracket perpendicular to the inner wall.

In an embodiment, the movable ray inspection system includes a first chamber and a second chamber, the first chamber is arranged at a side of the scanning passage in the container yard, and the second chamber is arranged at the other side of the scanning passage, the second chamber is provided with the second ray generator device and the second ray receiving device and the first chamber and the second chamber are provided with the moving devices on their bottom surface.

In an embodiment, the movable ray inspection system includes a first chamber, a second chamber and a third chamber, the first chamber is arranged at one side of the scanning passage in the container yard, the second chamber is arranged at the other side of the scanning passage in the container yard, and the third chamber is arranged under the scanning passage in the container yard, and wherein the first chamber is provided with the first ray generator device and the first ray receiving device therein, the second chamber is provided with the second ray generator device and the second ray receiving device therein, the third chamber is provided with the third ray generator device and the third ray receiving device therein, and the first, second and third chambers are all provided with the moving devices on their bottom surface.

In an embodiment, the movable ray inspection system further includes a control device that is in communication with a control system in the container yard and/or a database in the container yard, and the control device is electrically connected with the driving device so as to control the driving device.

In an embodiment, the movable ray inspection system further includes a photoelectric conversion device configured to convert the ray received by the ray receiving device to a digital signal, the photoelectric conversion device being in communication with the control device so as to transmit image information as the digital signal to the control device.

In an embodiment, the movable ray inspection system further includes a container symbol identification device configured to identify contain symbol and be in communication with the control device so as to transmit the identified container symbol information to the control device, the control device being configured to, according to the identified container symbol, read corresponding container information from the control system of the container yard and/or a database of the container yard and to bond the container information to the image information.

According to another aspect, a ray inspection method for inspecting a container in a container yard using the above movable ray inspection system, wherein the method comprises:

stacking the movable ray inspection system in the container yard by using a container transfer apparatus in the container yard, such that the movable ray inspection system defines a scanning passage; and when the container transfer apparatus performs stacking operation to the container in the container yard, turning on the ray generator device of the movable ray inspection system and controlling the movable ray inspection system to move along the scanning passage in the container yard at a preset velocity, so as to scan the container to be inspected along a length direction of a container.

In an embodiment, the ray inspection method further includes: when the container transfer apparatus is in an idle state where no stacking operation is performed, turning on the ray generator device of the movable ray inspection system and controlling the movable ray inspection system to move along the scanning passage in the container yard at a preset velocity, so as to scan the container to be inspected along a length direction of a container.

In an embodiment, the ray inspection method further includes: after completing the scanning to a first stack of containers in the container yard, driving the movable ray inspection system to move to a second stack of containers which are located at different position from the first stack of containers in the container yard, so as to scan the second stack of containers.

BRIEF DESCRIPTION OF THE DRAWINGS

In order to make the object, technical scheme and advantages of the present disclosure more definitely, the present disclosure is further described in detail in conjunction with the embodiments with reference to the drawings. In the drawings.

DETAILED DESCRIPTION OF THE EMBODIMENTS

Figure 1:
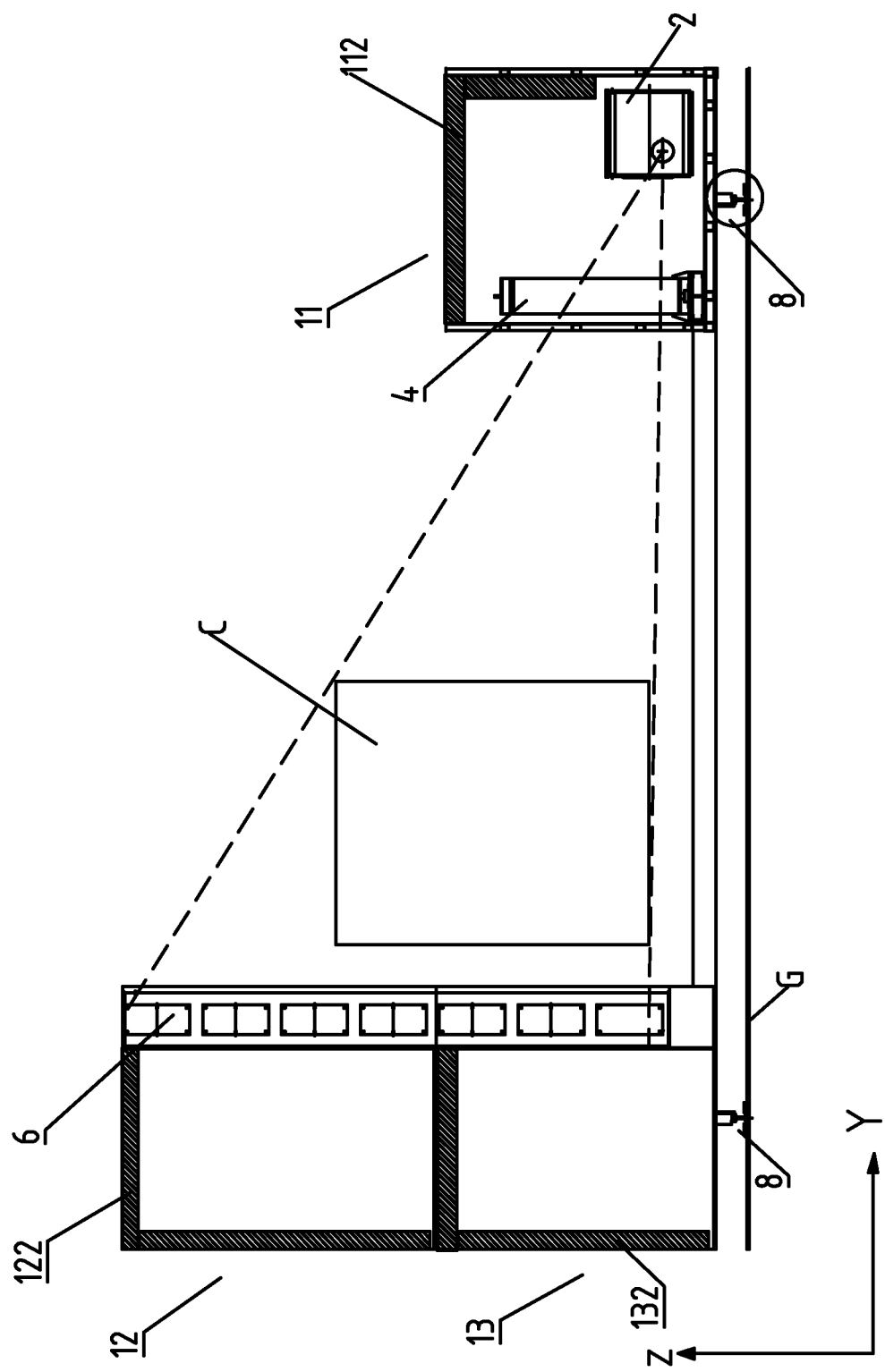
FIG. 1 is a schematic view of a movable ray inspection system according to an embodiment of the present disclosure, in which the movable ray inspection system includes three chambers, and the ray generator device and the ray receiving device are respectively arranged at either side of a scanning passage.

Embodiments of the present disclosure will be described in detail hereinafter. It is noted that the embodiments described herein are intended to for exemplar illustration, instead of limitation on the present disclosure. In the following description, an amount of special details are described in order to provide a complete understanding on the present disclosure. However, it is obvious for those skilled in the art that the present invention is not necessary to be implemented with the details herein. In other embodiments of the present disclosure, known structures, circuits, materials or processes are not described for avoiding confusing the present disclosure.

In this description, "an embodiment", "embodiments", "an example" or "examples" are used to represent features, structures or characteristics described in conjunction with the embodiment or example are included in at least one embodiment of the present disclosure. Thus, the wordings of "in an embodiment", "in the embodiment", "in an example" or "as an example" used in the whole description are not necessary to indicate the same embodiment or example. In addition, the special features, structures or characteristics may be combined in a suitable combination and/or sub-combination in one or more embodiment or example. In addition, it is understood by those skilled in the art that the term of "and/or" used herein includes any of one or more item listed herein that are associated with one another, or combination thereof.

In the drawings, for easy of description, an XYZ coordinate system is provided, in which X axis represents a direction of a scanning passage in a container yard, i.e., a length direction of a container, Y axis represents a width direction of the container and Z axis represents a height direction of the container.

In the disclosure, the terms of "first" and "second" do not mean order or difference of importance, but are intended to distinguish different components. In the disclosure, for brief, some devices such as the commonly known processor by those skilled in the art are not described in detail.

FIG. 1 illustrates a schematic view of a movable ray inspection system according to an embodiment of the present disclosure. The movable ray inspection system is configured to be arranged in a container yard to inspect object(s) in a container. It is noted that, in FIG. 1, in order to clearly illustrate the movable ray inspection system according to the present disclosure, other containers and a lifting mechanical device, etc. in the container yard are omitted.

The movable ray inspection system mainly includes: a ray generator device configured to emit a ray, a ray receiving device configured to receive the ray, and at least one chamber for receiving the ray generator device and the ray receiving device therein. The movable ray inspection system is configured to define a scanning passage. Each of the at least one chamber is configured to be a standard container or a chamber which has a same shape, a same size and a same structure as a standard container such that the movable ray inspection system is adapted to be stacked in the container yard. Herein, "each of the at least one chamber is configured to be a standard container or a chamber which has a same shape, a same size and a same structure as a standard container" means: each chamber has a shape of cuboid like a standard container and size of each chamber (including length, width and height, etc.) are respectively equal to those of the standard container; and, each chamber has the same structure as a standard container, and particularly has an outside coupling structure, for example, each chamber has the same hoisting coupling as a standard container such that each chamber is adapted to be hoisted by an existing lifting mechanism in the container yard. It can be seen that the movable ray inspection system according to embodiments of the present disclosure may be seamlessly mounted with a standard container in the container yard by using an existing lifting mechanism without providing a dedicated space and a special mounting apparatus, and thus the space may be saved and mounting and transfer operations may be simplified.

Figure 6:
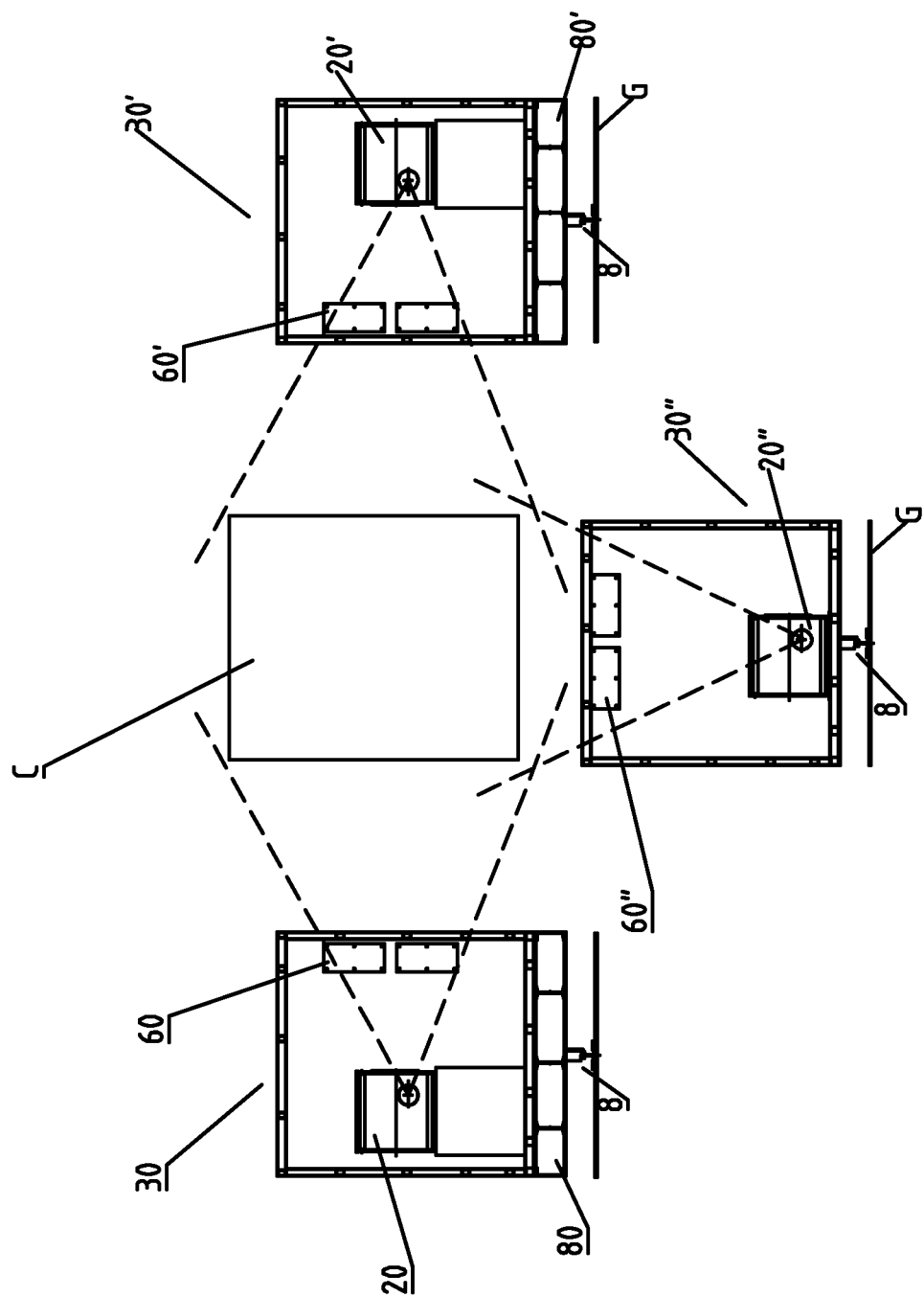
FIG. 6 is a schematic view of a movable ray inspection system according to an embodiment of the present disclosure, in which the movable ray inspection system includes three chambers so as to scan a container from a left side, a right side and a downside.
Figure 7:
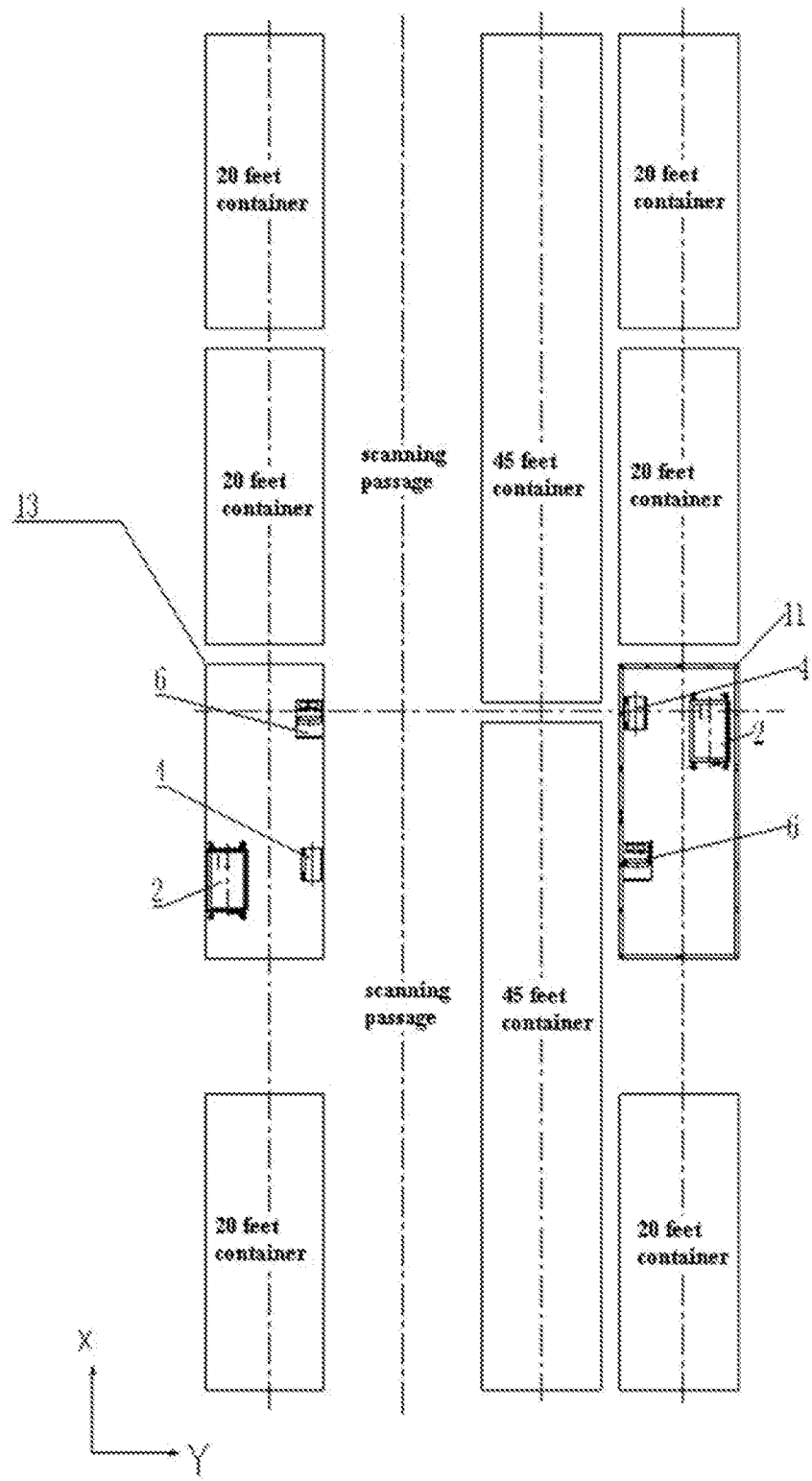
FIG. 7 schematically illustrates an arrangement of a movable ray inspection system according to an embodiment of the present disclosure when scanning a container in 45 feet length.

In the embodiment as shown in FIG. 1, the movable ray inspection system includes three chambers, i.e., a first chamber 11, a second chamber 12 and a third chamber 13. The first chamber 11 is arranged at a side (right side in FIG. 1) of the scanning passage P (as shown in FIGS. 6 and 7) in the container yard, the second chamber 12 and the third chamber 13 are arranged in up-down manner at the other side (left side in FIG. 1) of the scanning passage P in the container yard. A ray generator device 2 is disposed in the first chamber 11. The ray generator device 2 may be a radiation element such as cobalt-60, or may be an X-ray generator, or may be an X-ray machine, or also may be a neutron generator. The second chamber 12 and the third chamber 13 each may be provided with a ray receiving device 6 therein, and the ray receiving device 6 may include a plurality of detectors, detector array, etc.

Figure 1A:
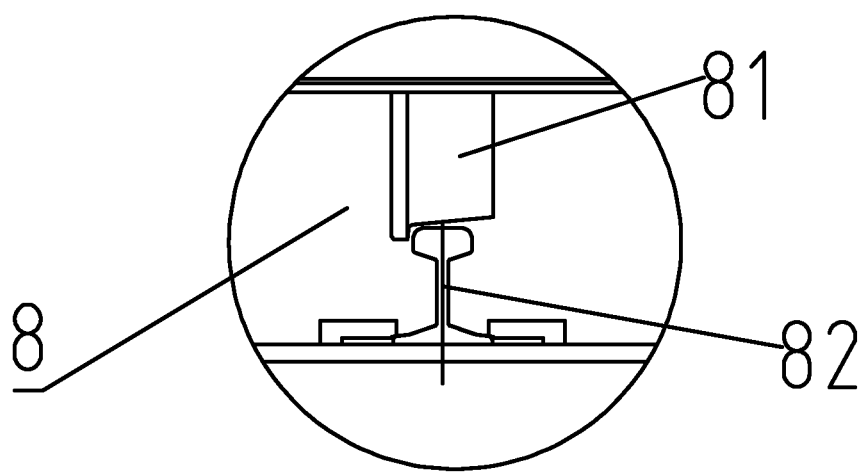
FIG. 1A is an enlarged partial view of a moving device of the ray inspection device according to an embodiment of the present disclosure.

The movable ray inspection system further includes a moving device 8. In an example, as shown in FIG. 1A, the moving device 8 includes a guide wheel 81 on the chamber and a guide rail 82 arranged on ground, in which the guide wheel 81 is movably fitted on the guide rail 82. Specifically, the first chamber 11 and the third chamber 13 located on downside are respectively provided with the guide wheels 81 on their low surface, and the guide rails 82 are respectively arranged, corresponding to the guide wheels 81, on ground, such that the guide wheels 81 may be respectively movably fitted on the two guide rails 82.

The movable ray inspection system may further include a driving device configured for driving the movable ray inspection system to move. In an example, the driving device may include an electric motor, an air motor or a hydraulic motor configured on body (for example, chamber) of the movable ray inspection system, i.e., the movable ray inspection system may be a self-driving or self-pushing device. In another example, the driving device may include a driving trailer or power head outside of the movable ray inspection system, which may be connected with the movable ray inspection system, when used, to pull the movable ray inspection system, that is, the movable ray inspection system may be an external force pushed device or an external force driven device.

Further, in order to allow the first chamber 11 and the second, third chamber 12, 13 at either side of the scanning passage P as shown in FIG. 1 to move synchronously, or more specifically, to allow the ray generator device 2 and the corresponding ray receiving device 6 at either side of the scanning passage P to move synchronously, a connection device 9 is provided between the first chamber 11 and the third chamber 13. The connection device 9 may be a rigid connection device, such as a connection rod 91. With this configuration, when the driving device drives the first chamber 11 located at right side of the scanning passage P to move along the rail 82, due to connection between the chambers at either side of the scanning passage by the connection rod 91, the second chamber 12 and the third chamber 13 at left side of the scanning passage P may move synchronously, that is, the ray generator device 2 and the corresponding ray receiving device 6 may move synchronously, so as to ensure ray generated by the ray generator device 2 may be received by the ray receiving device 6. Similarly, when the driving device drives the second chamber 12 and the third chamber 13 at left side of the scanning passage P to move along the guide rail 82, the first chamber 11 at right side of the scanning passage P will move synchronously. In the embodiment, due to the rigid connection device, it ensures the chambers at either side of the scanning passage to move synchronously such that, neither the driving devices in all chambers at both side of the scanning passage are provided nor the a complex synchronously-driving mechanism is provided to ensure the chambers at both sides of the scanning passage to synchronously move.

With this configuration, in the embodiment as shown in FIG. 1, a lifting mechanism lifts a container C to the movable ray inspection system (that is, to be located at a position between the ray generator device and the ray receiving device in the scanning passage). Upon driving of the driving device of the movable ray inspection system, the chambers 11, 12, 13 at either side of the scanning passage P move at a preset velocity along the scanning passage so as to scan the entire container C for inspection.

It is noted that, although the moving device includes the guide wheels and the guide rails and the guide rails are in shape of "I" in the embodiment as shown in FIG. 1, the moving device according to the present disclosure is not limited to this. For example, in an alternated embodiment, the moving device may include a guide rail in other shape, or may include a guide rail and a side block, or the moving device may be a wheel moving device, that is, the moving device may include movable wheel at bottom portion of the chambers.

As shown in FIG. 1, the first chamber 11 may be further provided with a collimator 4 therein, and the ray generator device 2, the collimator 4 and the ray receiving device 6 are substantially aligned with one another in a second direction (Y axis direction) perpendicular to the first direction (X axis direction as shown in FIG. 6) of the scanning passage P, such that ray emitted by the ray generator device 2 may be received by the ray receiving device 6. In other words, the ray generator device 2, the collimator 4 and the ray receiving device 6 are substantially located in a same plane perpendicular to the first direction of the scanning passage P. Furthermore, the ray generator device 2 is configured such that the ray emitted by the ray generator device 2 can scan the entire container C along the height direction (Z axis direction as shown in FIG. 1) of the container. It is understood for those skilled in the art that the container C may be hanged by a lifting mechanism in the container yard.

Further, in an embodiment, a height of the moving device 8 (i.e., the height in Z direction of the moving device including the guide wheel 81 and the guide rail 82 as shown in FIG. 1) is equal to a difference between the height of the high container and that of the standard container. Since a height of the chamber of the movable ray inspection system is usually equal to the height of the standard container, a sum of the height of the moving device and that of the chamber is just equal to the height of the high container when the chamber of the movable ray inspection system is mounted on the guide rail. That is, the arrangement of the moving device and the chamber still meets the requirement in terms of size in the container yard and thus does not interrupt the stacking of the other containers in the container yard.

As shown in FIG. 1, the chambers 11, 12, 13 may each be provided respectively with ray protective devices 112, 122, 132 to prevent radiation from leaking to ambience or eliminate amount of radiation that leaks to ambience. The ray protective devices 112, 122, 132 may be arranged on a top inner wall, a side inner wall or a bottom inner wall of respective chamber according to requirement of radiation protection. The ray protective device may be configured to shield ray at preset location or to shield the ray at preset time.

It is noted that, as the movable ray inspection system according to the present disclosure may be mounted in a container yard by a lifting mechanism in the container yard and a current normal container yard has substantially been achieved fully mechanical, automatic operation, i.e., no special operator is needed here, compared to the container inspection system in prior art which is needed to be transferred to a dedicated container inspection system by a dedicated person-driven vehicle, the container inspection system according to the disclosure reduces requirement of radiation protection, and thus may have a simplified structure and reduced product cost.

Figure 2:
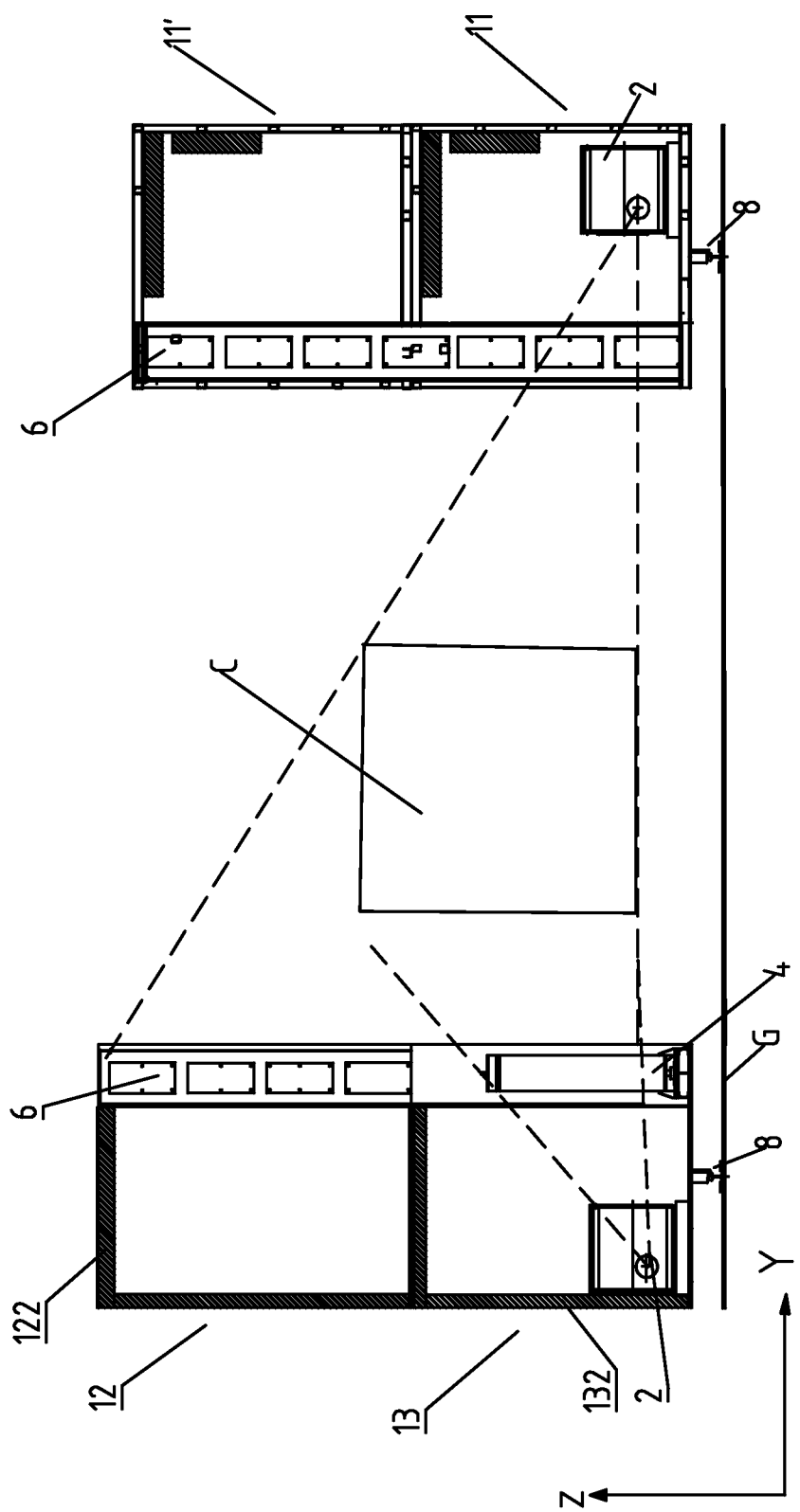
FIG. 2 is a schematic view of a movable ray inspection system according to an embodiment of the present disclosure, in which the movable ray inspection system includes four chambers, and the ray generator device and the ray receiving device are respectively arranged at either side of a scanning passage.

FIG. 2 illustrates a schematic view of a movable ray inspection system according to another embodiment of the present disclosure. For avoiding repeatedly description, the following description is mainly related to differences of this embodiment from the embodiment as shown in FIG. 1.

As shown in FIG. 2, the movable ray inspection system includes four chambers, i.e., a first chamber 11, a second chamber 11', a third chamber 12 and a fourth chamber 13, the second chamber 11' and the first chamber 11 are arranged in an up-down stack manner at a side of a scanning passage P in the container yard, and the third chamber 12 and the fourth chamber 13 are arranged in an up-down stack manner at the other side of the scanning passage P in the container yard.

In combination with FIGS. 2 and 6, the first chamber 11 is located under the second chamber 11', the fourth chamber 13 is located under the third chamber 12, the first chamber 11 located downside and the fourth chamber 13 located downside are each provided with the ray generator device 2 and the ray receiving device 6. It is noted that the ray receiving device 6 in the fourth chamber 13 in FIG. 2 is not shown as it is blocked. The second chamber 11' located upside and the third chamber 12 located upside are each provided with a ray receiving device 6 therein. As shown in FIG. 6, the ray generator device 2 and the ray receiving device 6 arranged in each of the first chamber 11 located downside and the fourth chamber 13 located downside are configured to space from each other in the X axis direction. As shown in FIG. 2, the ray generator device 2 in the first chamber 11 substantially aligns with the ray receiving devices 6 in the third chamber 12 and the fourth chamber 13 in the Y axis direction, i.e., the ray generator device 2 in the first chamber 11 is substantially located in a same YZ plane as the ray receiving devices 6 in the third chamber 12 and the fourth chamber 13, and the ray receiving devices 6 in the first chamber 11 and the second chamber 11' align with the ray generator device 2 in the fourth chamber 13 in the Y direction, i.e., the ray receiving devices 6 in the first chamber 11 and the second chamber 11' are substantially located in a same YZ plane as the ray generator device 2 in the fourth chamber 13. With this configuration, the ray emitted by the ray generator device 2 in the first chamber 11 is received by the ray receiving devices 6 in the third chamber 12 and the fourth chamber 13, and the ray emitted by the ray generator device 2 in the fourth chamber 13 is received by the ray receiving devices 6 in the first chamber 11 and the second chamber 11'.

In the embodiment, the movable ray inspection system may also include the moving device 8, the connection device 9 and the driving device, which are the same as the corresponding components in the above embodiment and are not repeatedly described. With this configuration, when the container C is hanged in the movable ray inspection system and the movable ray inspection system located at either side of the container C synchronously mover, the container C may be scanned and inspected from both sides of the container C synchronously, thereby allowing further effective inspection on the container C.

The above embodiments provide implementations in which the ray generator device and the ray receiving device of the movable ray inspection system are arranged at either side of the scanning passage, i.e., the movable ray inspection system is implemented in ray transmission manner. The movable ray inspection system according to the present disclosure may be implemented in ray back-scattering manner, and is described in detail below in conjunction with FIGS. 3-6.

Figure 3:
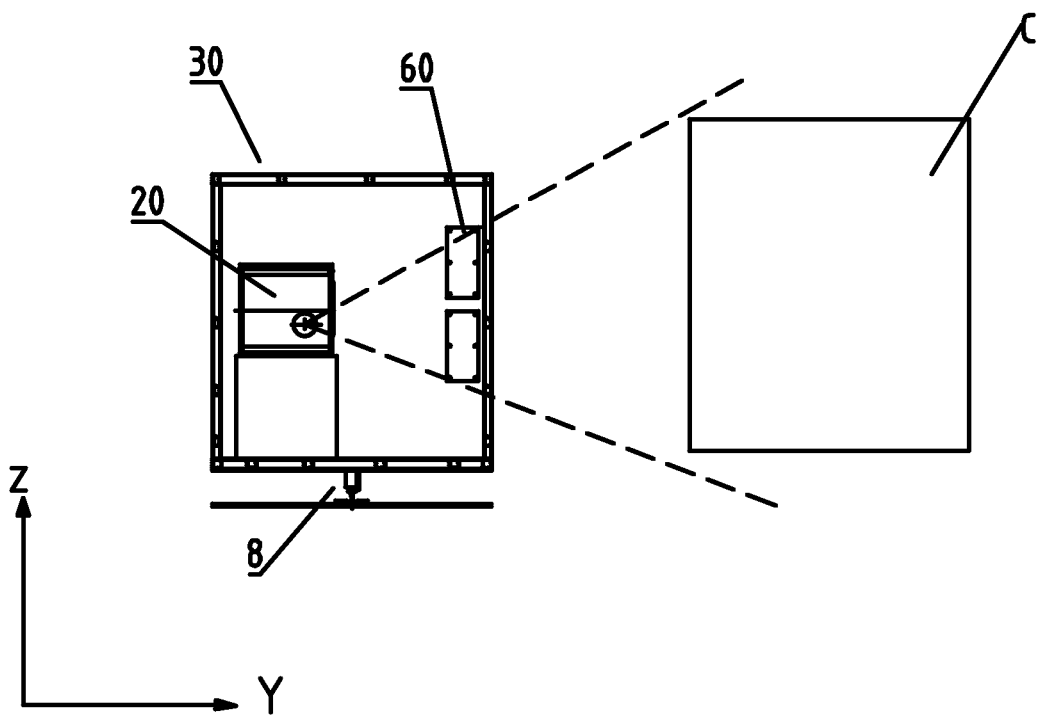
FIG. 3 is a schematic view of a movable ray inspection system according to an embodiment of the present disclosure, in which the movable ray inspection system includes one chamber, and the ray generator device and the ray receiving device are arranged at the same side of a scanning passage.

In the embodiment as shown in FIG. 3, a movable ray inspection system includes one chamber 30 arranged at a side of a scanning passage P in a container yard, and a ray generator device 20 and a ray receiving device 60 are arranged in the chamber 30. That is, the ray generator device 20 and the ray receiving device 60 are arranged at the same side of the scanning passage P and they are in the chamber 30. The chamber 30 is the same as the above chamber and is configured to be a standard container or is configured to have a same shape, a same size and a same structure as a standard container. The ray generator device 20 is configured such that the ray emitted by the ray generator device 20 may scan the entire container C in a height direction (the Z axis direction as shown in FIG. 3) of the container. It is understood for those skilled in the art that the container C is hoisted by a lifting mechanism in the container yard. Similar to the embodiment as shown in FIG. 1, the ray inspection device may further include the moving device 8, the moving device 8 may include the guide wheels 81 disposed on the bottom surface of the chamber 30, the guide rails 82 may be provided on ground corresponding to the guide wheels 81 and the guide wheels 81 may movably fitted on the guide rail 82. Different from the embodiment as shown in FIG. 1, in the embodiment as shown in FIG. 3, since the ray generator device 20 and the ray receiving device 60 of the movable ray inspection system are arranged at the same side of the scanning passage, it is not necessary to provide a connection device in the movable ray inspection system to ensure the ray generator device 20 and the ray receiving device 60 to move synchronously. In addition, it is understood that the movable ray inspection system further includes a driving device, which is the same as the driving device in the above embodiment in terms of working principle and structure and is not repeatedly described for brief.

As such, in the embodiment as shown in FIG. 3, when the lifting mechanism lifts the container C at a position in the scanning passage P, facing the movable ray inspection system, under driving of the driving device of the movable ray inspection system, the chamber 30 at one side of the scanning passage P moves at the preset velocity along the scanning passage P so as to scan and inspect the container C.

Although not shown in FIG. 3, it is understood that the movable ray inspection system in FIG. 3 may also include the above ray protective device.

Figure 4:
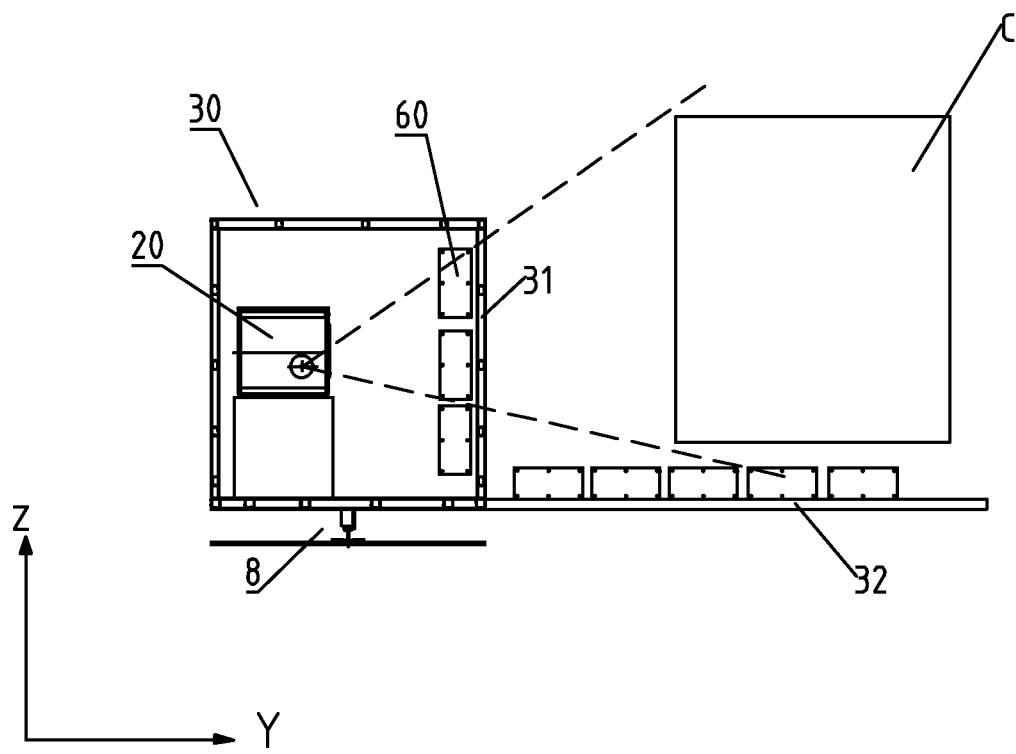
FIG. 4 is a schematic view of a movable ray inspection system according to an embodiment of the present disclosure, in which the ray receiving device includes a plurality of detectors arranged in a shape of "L"

FIG. 4 illustrates a schematic view of a movable ray inspection system according to another embodiment of the present disclosure. For avoiding repeating description, the following context mainly relates to difference of the embodiment from FIG. 3.

As shown in FIG. 4, the movable ray inspection device includes a ray receiving device 60, which includes a plurality of detectors arranged in a shape of "L". Specifically, a part of the detectors are arranged on the vertical inner wall 31 of the chamber 30 while the other detectors are arranged on a cross bracket perpendicular to the vertical inner wall.

Figure 5:
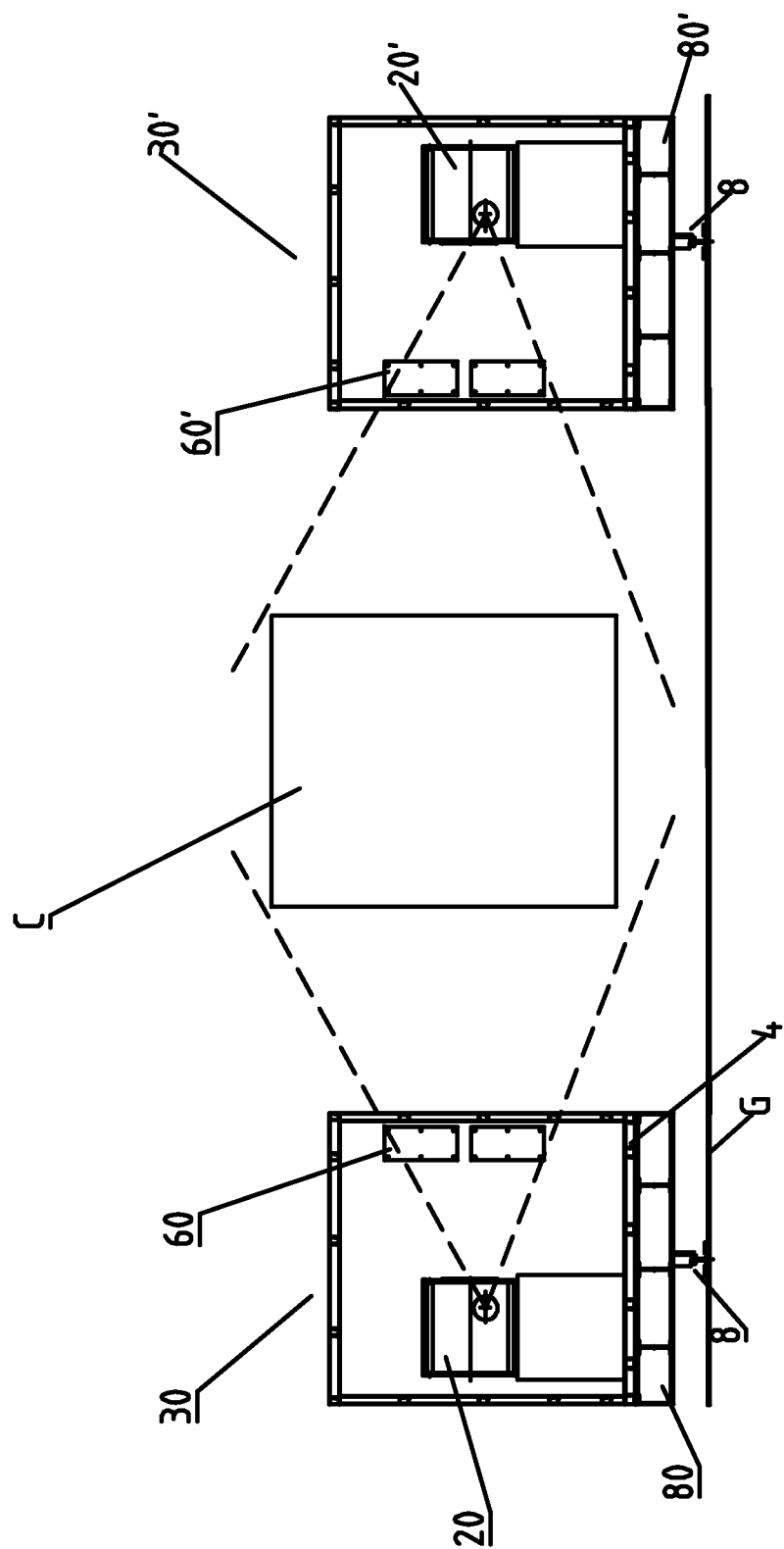
FIG. 5 is a schematic view of a movable ray inspection system according to an embodiment of the present disclosure, in which the movable ray inspection system includes two chambers so as to scan a container from both sides thereof.

FIG. 5 illustrates a schematic view of a movable ray inspection system according to another embodiment of the present disclosure. For avoiding repeating description, the following context mainly relates to difference of the embodiment from FIG. 3. In the embodiment as shown in FIG. 5, the movable ray inspection system includes two chambers 30, 30', and the chamber 30, 30' are respectively arranged at a right side and a left side of the scanning passage P in the container yard. A ray generator device 20 and a ray receiving device 60 are provided in the chamber 30, and a ray generator device 20' and a ray receiving device 60' are provided in the chamber 30'. In the embodiment, the ray emitted by the ray generator device 20 is received by the ray receiving device 60, and the ray emitted by the ray generator device 20' is received by the ray receiving device 60'. The movable ray inspection system further includes moving devices 8 arranged at the chambers 30, 30'. Scan and inspection on the container C thus may be performed at both sides of the container C by configuring back-scattering movable ray inspection system at both sides of the scanning passage P, thereby achieving more effective inspection on the container C.

FIG. 6 illustrates a schematic view of a movable ray inspection system according to another embodiment of the present disclosure. For avoiding repeating description, the following context mainly relates to difference of the embodiment from FIG. 3.

In the embodiment as shown in FIG. 6, the movable ray inspection system includes three chambers 30, 30', 30", in which the structure and arrangement of the chambers 30, 30' are similar to those in the embodiment as shown in FIG. 5 and the chamber 30" is provided with a ray generator device 20" and a ray receiving device 60". As shown in FIG. 6, the chamber 30" is arranged under the container C to be inspected so as to scan and inspect the container C from downside thereof. The movable ray inspection system further includes moving devices 8 respectively disposed at the chambers 30, 30', 30". With this configuration, scan and inspection on the container C may be performed simultaneously from left side, right side and downside, so as to obtain more effective inspection on the container C.

It is understood that, in order to mounting of the chamber 30", a recess (not shown) may be made in the ground under the scanning passage P and the chamber 30" is arranged in the recess; or, the chamber 30" may be placed on ground while the chambers 30, 30' are arranged on locations in higher level. In the latter situation, the container C to be inspected will be hoisted in higher level by the lifting mechanism when passing through the scanning passage P so as to allow scan and inspection on the container C to be performed at the downside of the container C.

Various embodiments of the movable ray inspection system of the present disclosure are described above in conjunction with FIGS. 1-6. Common components of those movable ray inspection systems according to the embodiments of the present disclosure will be further described.

Although not shown, it is understood that a control system configured to control apparatuses, mechanisms and devices in the container yard is provided in the container yard. The movable ray inspection system according to the present disclosure further includes a control device that is in communication with the control system of the container yard and/or a database of the container yard so as to achieve signal and date transmission with the control system of the container yard. Further, the control system may be electrical connected with the above driving device to control the driving device.

In an embodiment, the movable ray inspection system further includes a photoelectric conversion device configured to convert the ray received by the ray receiving device to digital signal, and the photoelectric conversion device is in communication with the control device to transmit image information to the control device.

In an embodiment, the movable ray inspection system further includes a container symbol identification device 50 (as shown in FIG. 7) that is in communication with the control device so as to transmit the identified container symbol information of the container to the control device. The control device is further configured to read the corresponding container information from the control system of the container yard and/or a database of the container yard according to the identified container symbol, and to bond the container information to the image information.

Further, the movable ray inspection system may further include a power distribution device configured to supply electrical power and/or perform power distribution to electronic devices in the chambers of the movable ray inspection system.

Further, the control device of the movable ray inspection system includes a processor configured to communicate with other associated systems and to perform analyzing and processing on the image and/or data captured by the movable ray inspection system.

Figure 8:
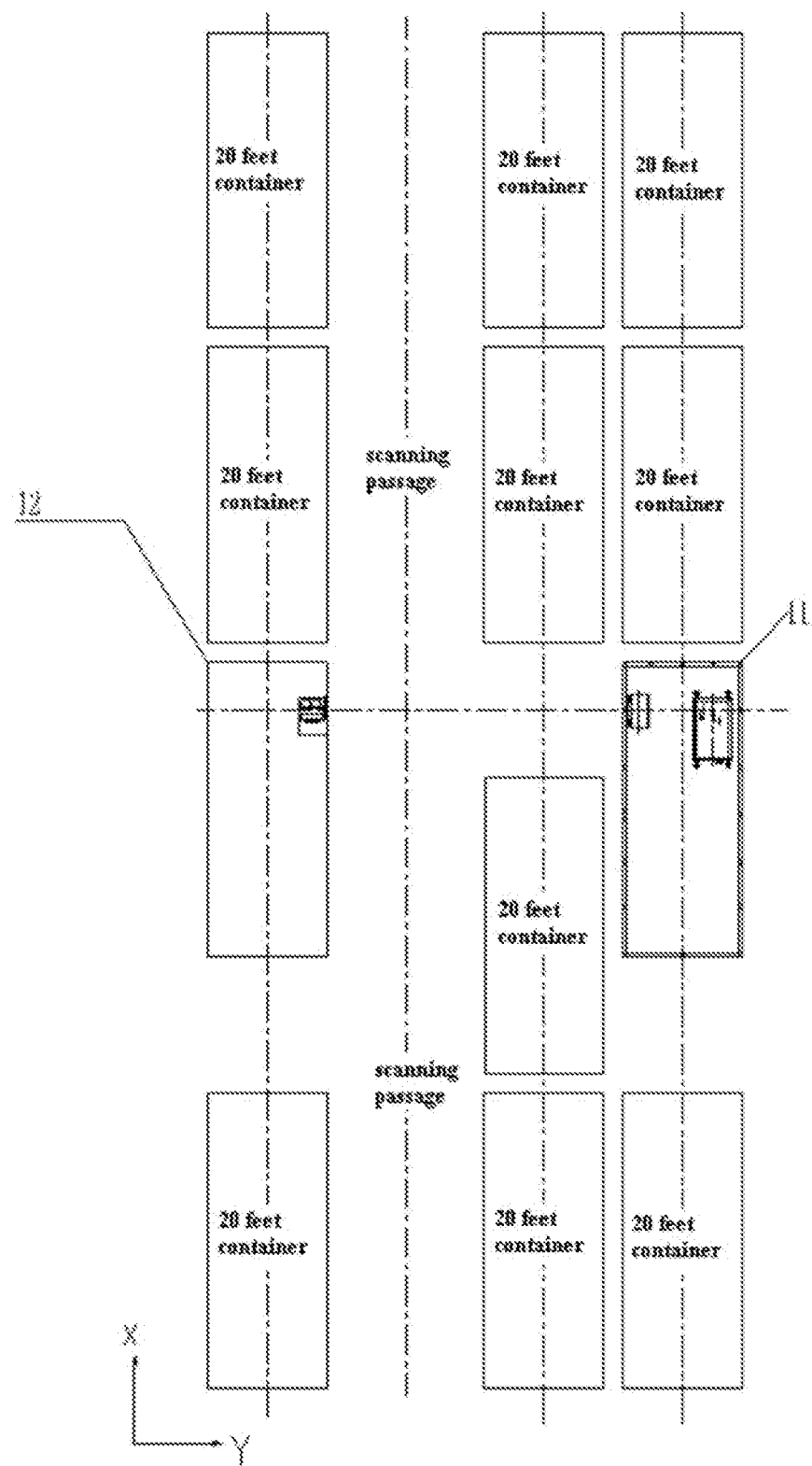
FIG. 8 schematically illustrates an arrangement of a movable ray inspection system according to an embodiment of the present disclosure when scanning a container in 20 feet length.

A ray inspection method for inspecting a container in a container yard by using the above described movable ray inspection system will be described in conjunction with FIGS. 7~8. The method may include: stacking the movable ray inspection system in the container yard by using a container transfer apparatus (for example, a lifting mechanism, etc.) in the container yard. In the embodiment as shown in FIGS. 7 and 8, the chambers 11 or 11', 12, 13 of the movable ray inspection system are illustratively arranged at either side of the scanning passage P respectively. However, as described above, the chambers of the movable ray inspection system may be arranged at the same side of the scanning passage P. FIGS. 7 and 8 respectively schematically illustrate embodiments where a container in 45 feet length and a container in 20 feet length are scanned.

In an embodiment, the ray inspection method may be performed while stacking the container. That is, the ray inspection method according to the present disclosure may further include: when the container transfer apparatus performs stacking operation to the container in the container yard, positioning a container to be inspected by using the container transfer apparatus in an inspection region of the movable ray inspection system, and then turning on the ray generator device of the movable ray inspection system and controlling the driving device of the movable ray inspection system to drive the movable ray inspection system to move at a preset velocity along the scanning passage to scan the container to be inspected along a length direction of the container.

Further, the ray inspection method according to the present disclosure may further be implemented when the container transfer apparatus is in an idle state (for example, at night). That is, the ray inspection method according to the present disclosure may further include: when the container transfer apparatus is in an idle state where no stacking operation is performed, positioning a container to be inspected by using the container transfer apparatus in an inspection region of the movable ray inspection system, and then turning on the ray generator device of the movable ray inspection system and controlling the driving device of the movable ray inspection system to drive the movable ray inspection system to move at a preset velocity along the scanning passage to scan the container to be inspected along a length direction of the container.

It can be seen that the ray inspection method according to the present disclosure may allow inspection time to be flexibly planned according to requirement of routine schedule of the container yard.

In one embodiment, the movable ray inspection method according to the present disclosure may further include:

identifying the container symbol on the container that is being scanned;

reading the corresponding container information from the control system of the container yard and/or the database of the container yard according to the container symbol; and bonding the container information to image information obtained by scanning of the movable ray inspection system.

In order to transfer the movable ray inspection system according to the present disclosure to another location, the ray inspection method according to the present disclosure may further include:

after completing the scanning to a first stack of containers in the container yard, transferring the movable ray inspection system to a second stack of containers which are located at different position from the first stack of containers in the container yard by using the container transfer apparatus in the container yard, so as to scan the second stack of containers. With the simple operation, transfer of the movable ray inspection system may be achieved without a dedicated transportation apparatus and transferring efficiency may be increased.

In the movable ray inspection system and the ray inspection method according to embodiments of the present disclosure, all components of the inspection system are mounted in one or more container-like chamber and the one or more chamber are stacked with other standard container in a container yard and, when (for example, lifting machine) works, will be hoisted and passed through the inspection system, achieving the scanning to the container. The container inspection system may be directly arranged in a container yard without provision of additional or dedicated place for apparatus, and an amount of place may be saved. Further, the movable ray inspection system and the ray inspection method according to embodiments of the present disclosure do not require transferring a container by a vehicle to a separated location or an operation field, and may be directly mounted in a container yard and control the movable ray inspection system itself to complete scan, thereby further increasing inspection efficiency. Further, the container-like chambers of the movable ray inspection system according to the present disclosure may be conveniently transferred to or mounted in another location or field by using an existing lifting machine or other container transfer apparatus, and the container-like chambers of the movable ray inspection system may themselves move, thereby largely reducing difficulty in assembly and transfer of the container inspection system as desired.

Although the present disclosure is described with reference to several typical embodiments, it is understood that the terms as used are illustrative and exemplary terms, instead of limitation terms. As the present invention may be implemented in a plurality of embodiments without departed from the spirit of the present disclosure, it is understood that the above embodiments are not limited to the above detail, but shall be interpreted widely within the spirit and scope defined by the claims. Thus, all changes and modifications of the embodiments which fall into the scope or equivalent of the claims shall be covered by the attached claims.

The invention claimed is:

1. A movable ray inspection system used to be mounted in a container yard to inspect an object within a container, the movable ray inspection system comprising:
a ray generator device configured to emit a ray;
a ray receiving device configured to receive the ray;
at least one chamber for receiving the ray generator device and the ray receiving device therein; and
a moving device;
the movable ray inspection system being configured to define a scanning passage by the at least one chamber for inspection of the container, wherein:
each of the at least one chamber is configured to have a same shape, a same size and a same structure as a standard container, such that the movable ray inspection system is adapted to be stacked in the container yard, and the moving device is configured to support and move the each of the at least one chamber in a preset direction so as to inspect the object within the container, and
wherein a height of the moving device is equal to a difference between a height of a high container and a height of the standard container.

2. The movable ray inspection system according to claim 1, wherein each of the at least one chamber is provided with a hoisting coupling, which is the same as that of the standard container, so as to be hoisted by a container transfer apparatus.

3. The movable ray inspection system according to claim 1, wherein the moving device comprises a guide wheel arranged on a bottom surface of the chamber and a guide rail arranged on ground, and the guide wheel is movably fitted on the guide rail; or, the moving device comprises a moving wheel mounted on the bottom surface of the chamber.

4. The movable ray inspection system according to claim 1, further comprising a driving device configured for driving the movable ray inspection system to move.

5. The movable ray inspection system according to claim 1, wherein the movable ray inspection system includes a first chamber, a second chamber and a third chamber, the first chamber is arranged at a side of the scanning passage in the container yard, and the second chamber and the third chamber, stacked up-down with each other, are arranged at the other side of the scanning passage, and
the first chamber is provided with the ray generator device therein, and each of the second chamber and the third chamber is provided with the ray receiving device therein, and the ray generator device and the ray receiving devices are substantially aligned with one another in a second direction perpendicular to a first direction along which the scanning passage extends.

6. The movable ray inspection system according to claim 1, wherein the movable ray inspection system comprises a first chamber, a second chamber, a third chamber and a fourth chamber, the second chamber and the first chamber, stacked up-down with each other, are arranged at a side of the scanning passage in the container yard, and the third chamber and the fourth chamber, stacked up-down with each other, are arranged at the other side of the scanning passage, and wherein,
each of the first chamber located downside and the fourth chamber located downside is provided with the ray generator device and the ray receiving device therein, and each of the second chamber located upside and the third chamber located upside is provided with the ray receiving device, wherein the ray generator device and the ray receiving device provided in each of the first chamber and the fourth chamber are arranged to space away from each other in the first direction along which the scanning passage extends, and the ray generator device in the first chamber is substantially aligned with the ray receiving devices in the third chamber and the fourth chamber in the second direction perpendicular to the first direction, and the ray receiving devices in the first chamber and the second chambers are substantially aligned with the ray generator device in the fourth chamber in the second direction perpendicular to the first direction.

7. The movable ray inspection system according to claim 5, wherein the first chamber and the third chamber located downside are both provided with the moving devices on their bottom surfaces respectively.

8. The movable ray inspection system according to claim 6, wherein the first chamber located downside and the fourth chamber located downside are both provided with the moving devices on their bottom surfaces respectively.

9. The movable ray inspection system according to claim 5, wherein the movable ray inspection system further comprises a rigid connection device configured to connect the chambers at either side of the scanning passage.

10. The movable ray inspection system according to claim 1, wherein the movable ray inspection system comprises a chamber arranged at a side of the scanning passage in the container yard and provided with the ray generator device and the ray receiving device.

11. The movable ray inspection system according to claim 1, wherein the movable ray inspection system comprises a chamber arranged at a side of the scanning passage in the container yard and, the ray generator device is disposed within the chamber and comprises a plurality of detectors arranged in a shape of "L", wherein a part of the plurality of detectors are arranged on an inner wall of the chamber and the other part of the plurality of detectors are arranged on a cross bracket perpendicular to the inner wall.

12. The movable ray inspection system according to claim 1, wherein the movable ray inspection system includes a first chamber and a second chamber, the first chamber is arranged at a side of the scanning passage in the container yard, and the second chamber is arranged at the other side of the scanning passage, the second chamber is provided with the second ray generator device and the second ray receiving device and the first chamber and the second chamber are provided with the moving devices on their bottom surface.

13. The movable ray inspection system according to claim 1, wherein the movable ray inspection system includes a first chamber, a second chamber and a third chamber, the first chamber is arranged at one side of the scanning passage in the container yard, the second chamber is arranged at the other side of the scanning passage in the container yard, and the third chamber is arranged under the scanning passage in the container yard, and wherein the first chamber is provided with the first ray generator device and the first ray receiving device therein, the second chamber is provided with the second ray generator device and the second ray receiving device therein, the third chamber is provided with the third ray generator device and the third ray receiving device therein, and the first, second and third chambers are all provided with the moving devices on their bottom surface.

14. The movable ray inspection system according to claim 4, further comprising a control device that is in communication with a control system in the container yard and/or a database in the container yard, and the control device is electrically connected with the driving device so as to control the driving device.

15. The movable ray inspection system according to claim 14, further comprising a photoelectric conversion device configured to convert the ray received by the ray receiving device to a digital signal, the photoelectric conversion device being in communication with the control device so as to transmit image information as the digital signal to the control device.

16. The movable ray inspection system according to claim 15, further comprising a container symbol identification device configured to identify contain symbol and be in communication with the control device so as to transmit the identified container symbol information to the control device, the control device being configured to, according to the identified container symbol, read corresponding container information from the control system of the container yard and/or a database of the container yard and to bond the container information to the image information.

17. A ray inspection method for inspecting a container in a container yard using the movable ray inspection system according to claim 1, characterized in that, the method comprises:
stacking the movable ray inspection system in the container yard by using a container transfer apparatus in the container yard, such that the at least one chamber of the movable ray inspection system defines a scanning passage; and
when the container transfer apparatus performs stacking operation to the container in the container yard, turning on the ray generator device of the movable ray inspection system and controlling the movable ray inspection system to move along the scanning passage in the container yard at a preset velocity, so as to scan the container to be inspected along a length direction of a container.

18. The ray inspection method according to claim 17, further comprising:
when the container transfer apparatus is in an idle state where no stacking operation is performed, turning on the ray generator device of the movable ray inspection system and controlling the movable ray inspection system to move along the scanning passage in the container yard at a preset velocity, so as to scan the container to be inspected along a length direction of a container.

19. The ray inspection method according to claim 17, further comprising:
after completing the scanning to a first stack of containers in the container yard, driving the movable ray inspection system to move to a second stack of containers which are located at different position from the first stack of containers in the container yard, so as to scan the second stack of containers.

* * * * *